US006718216B2

(12) United States Patent  
Grier (10) Patent No.: US 6,718,216 B2
(45) Date of Patent: Apr. 6, 2004

(54) VARIABLE SPEED AUTOMATIC CAR WASH (75) Inventor: Richard M. Grier, Ankeny, IA (US)

(73) Assignee: Ryko Manufacturing Company, Grimes, IA (US)

( * ) Notice: Subject to any disclaimer, the term of this patent is extended or adjusted under 35 U.S.C. 154(b) by 0 days.

(21) Appl. No.: 10/173,742

(22) Filed: Jun. 18, 2002

(65) Prior Publication Data

US 2003/0233153 A1 Dec. 18, 2003

(51) Int. Cl.[7] .............................................. G06F 17/00
(52) U.S. Cl. ........................................ 700/90; 134/56 R
(58) Field of Search ............................ 700/11, 90, 117; 134/123, 56 R, 57 R, 45

(56) References Cited

U.S. PATENT DOCUMENTS

| 4,999,763 | A | 3/1991 | Ousborne | 700/11 |
|---|---|---|---|---|
| RE33,849 | E | 3/1992 | Detrick | 700/11 |
| 5,173,692 | A | 12/1992 | Shapiro et al. | 340/943 |
| 5,482,212 | A | 1/1996 | Kobryn et al. | 239/227 |
| 5,886,648 | A | 3/1999 | McElroy et al. | 340/943 |
| 6,237,614 | B1 * | 5/2001 | Retter | 134/99.1 |
| 6,264,754 | B1 | 7/2001 | Bowman | 134/6 |
| 6,324,520 | B1 * | 11/2001 | Walker et al. | 705/16 |
| 6,325,863 | B1 | 12/2001 | Zamensky et al. | 134/18 |
| 6,571,807 | B2 * | 6/2003 | Jones | 134/56 R |
| 2003/0127119 | | * 7/2003 | Scordo | 134/57 R |

* cited by examiner

Primary Examiner—Leo Picard
Assistant Examiner—Zoila Cabrera
(74) Attorney, Agent, or Firm—McAndrews, Held & Malloy, Ltd.

(57) ABSTRACT

A method of operating an automatic car wash system has been developed. The automatic car wash system includes a car wash unit and a central processing unit (CPU) controls operation of the car wash unit. The method includes programming wash parameters for a plurality of wash modes into the CPU and switching among a plurality of pre-programmed wash modes based on a rate of customer use of the car wash, number of vehicles waiting in line to use the car wash, environmental conditions, and/or operator's preference.

53 Claims, 5 Drawing Sheets

VARIABLE SPEED AUTOMATIC CAR WASH

BACKGROUND OF THE INVENTION

Embodiments of the present invention generally relate to an automatic car wash system, and more particularly to a variable speed automatic car wash system that switches among wash modes based on customer use of the car wash, environmental conditions and/or an operator's preference.

Historically, car washes were open for business only when one or more attendants were on duty to activate the wash equipment and guide vehicles into position. These attendants manually selected the services that each vehicle received.

Subsequently, automatic, unattended car washes were developed. Initially, such automatic car washes were capable of washing vehicles in one way, such that every vehicle received the same services applied in the same way.

More recently, automatic car washes were developed that provided different wash features depending on the price charged to the wash customer. For example, a lower price wash might not wax or dry the vehicle, whereas a high price wash might provide both services in addition to the basic wash. As the technology developed, the car wash industry began developing many different wash services, to allow wash operators to charge higher prices for washes and make higher profits. As electrical controls were replaced by electronic controls, technology allowed each car wash to offer numerous wash packages at different prices.

The advent of PLCs (programmable logic controllers) and computers allowed car wash manufacturers to produce equipment in which various details of wash cycles may be adjusted during set up to suit the individual operators' preferences and the details of the wash sites. In recent years, many car wash systems have been configured to allow the operator or the manufacturer's service personnel to adjust certain aspects of equipment operation. These adjustments affect wash quality, length of time required for a wash, and operating costs.

Automatic car wash systems typically allow the operators to "set up" their car wash equipment by controlling parameters such as cycle lengths and the wash features that are provided for a given price. These adjustments represent a compromise between wash quality, wash speed, and operating costs. Typically, a wash operator decides the quality of wash for an average customer's vehicle. The operator then attempts to maximize speed and minimize operating costs while accomplishing the quality of wash. Some operators decide that wash quality is extremely important to their success, and they adjust the equipment without much concern for speed and operating costs. Other operators believe that superior wash quality is not important to their customers, and choose to focus on high speed and low operating costs. Operators typically make adjustments to their systems during the set-up phase. Changing wash mode parameters after a system has been set up typically requires time and effort to reconfigure mechanical, electrical and/or controlling features of the system. Because of the time and effort required to change the wash mode parameters, the wash modes of typical automatic car wash systems are not changed after set up.

Regardless of an operator's philosophies, there are periods of time when they could benefit by operating the wash equipment differently from its typical settings. For example, during times of peak use, customer demand may exceed the capability of the wash equipment. During these periods of peak use, lines form and some customers choose to forego the wash in lieu of waiting in line. As a result, car wash operators miss some potential revenues. Consequently, some car wash operators have installed multiple car washes on the same property, or purchased more expensive equipment than they typically need, in an effort to wash more vehicles during peak times. Conversely, during periods of low use, the car wash operator could foster customer loyalty by increasing the quality of the wash that is provided for a given price.

There are also periods when the vehicles are generally clean, with only some easily-removed dust covering portions of the vehicles. During these periods, operators could reduce operating costs and increase throughput by increasing wash speeds. Conversely, there are some periods when vehicles are dirtier than usual, such as after snow or rainstorms, and cleaning is more difficult than usual. During these periods, operators might want to increase the wash quality produced by their car wash equipment at the expense of wash speed and operating costs. Increasing the wash quality at these times can increase customer satisfaction and ensure customers loyalty (and, consequently, increased customer frequency) in the future.

Car washes with full-time managers and attendants (typically conveyorized washes) have historically had the ability to change wash speeds and quality based on current conditions, e.g. weather conditions and/or the number of customers waiting in line. Typically, the managers and/or employees have the experience, knowledge, and time to make adjustments required to change wash speed or wash quality when desired. However, the managers and employees of the "attended" car washes monitor and attend to the car wash at all times.

Many unattended, automatic car washes are installed at gas stations or at self-service car washes. Unattended, automatic car washes typically have few or no employees. At most gas stations, the employees are required to stay near cash registers located within the central office. At most self-serve car washes, there are many hours per week when the car wash is open but there are no employees. Typically, the car wash systems do not use car wash attendants to activate and guide vehicles into position. Instead, the customer may be issued an activation code, e.g, at the pump or within the station. The customer may enter the code at an activation device. If the code is valid, the system directs the customer to drive his/her vehicle into a car wash housing. Once the vehicle is properly positioned in the car wash housing, the system begins to wash the automobile according to a preset wash mode program stored within a car wash control system. Some car wash systems may include an activation device or kiosk located near the car wash such that a customer may pay for a wash at the activation device. However, known automatic, unattended car washes are not capable of quickly changing wash speed and/or quality in response to customer usage and/or environmental conditions.

Thus, a need exists for a more efficient method of washing a vehicle in an automatic car washing system. Additionally, a need exists for a method and system of adapting the car wash system to customer demand. Also, a need exists for a method and system of adapting the car wash system to environmental conditions. Further, a need exist for an automatic car washing system that may quickly and easily transition between wash modes.

BRIEF SUMMARY OF THE INVENTION

Certain embodiments of the present invention provide a method of operating an automatic car wash system. The automatic car wash system includes a car wash unit and a control system, such as a PLC and/or a central processing unit (CPU) that controls the operation of the car wash unit. The method comprises programming wash mode parameters for a plurality of wash modes into the control system; storing parameters for each given wash mode; executing a wash mode based on the parameters; determining customer use of the car wash unit; and automatically or manually switching among the plurality of wash modes based on customer use of the car wash. The wash modes may be based on customer frequency (i.e., the rate at which customers use the car wash), customer demand, environmental conditions (such as snow, dust, salty or wet roads, current temperature, etc.), or the operator's particular preference.

Certain embodiments of the present invention also provide a variable speed automatic vehicle washing system. The system includes an automated car wash and a car wash control system. The car wash control system may include a CPU and/or a PLC, an operator interface unit, and a customer rate sensor.

The operator interface unit is electronically connected to the control system. The operator interface unit is used for inputting first and second sets of wash mode parameters into the control system. The control system stores the first and second sets of wash mode parameters as first and second wash mode instructions, respectively.

The customer rate sensor is electronically connected to the control system. The control system determines a first and second customer frequency through the customer rate sensor detecting customer use of the automated car wash. The control system operates the automated car wash for a first length of time according to the first set of wash mode parameters when the control system determines the first customer frequency. The control system operates the automated car wash for a second length of time according to the second set of wash mode parameters when the control system determines the second customer frequency.

The foregoing summary, as well as the following detailed description of certain embodiments of the present invention, will be better understood when read in conjunction with the appended drawings. For the purpose of illustrating the invention, there is shown in the drawings, certain embodiments. It should be understood, however, that the present invention is not limited to the arrangements and instrumentalities shown in the attached drawings.

DETAILED DESCRIPTION OF THE INVENTION

Figure 1:
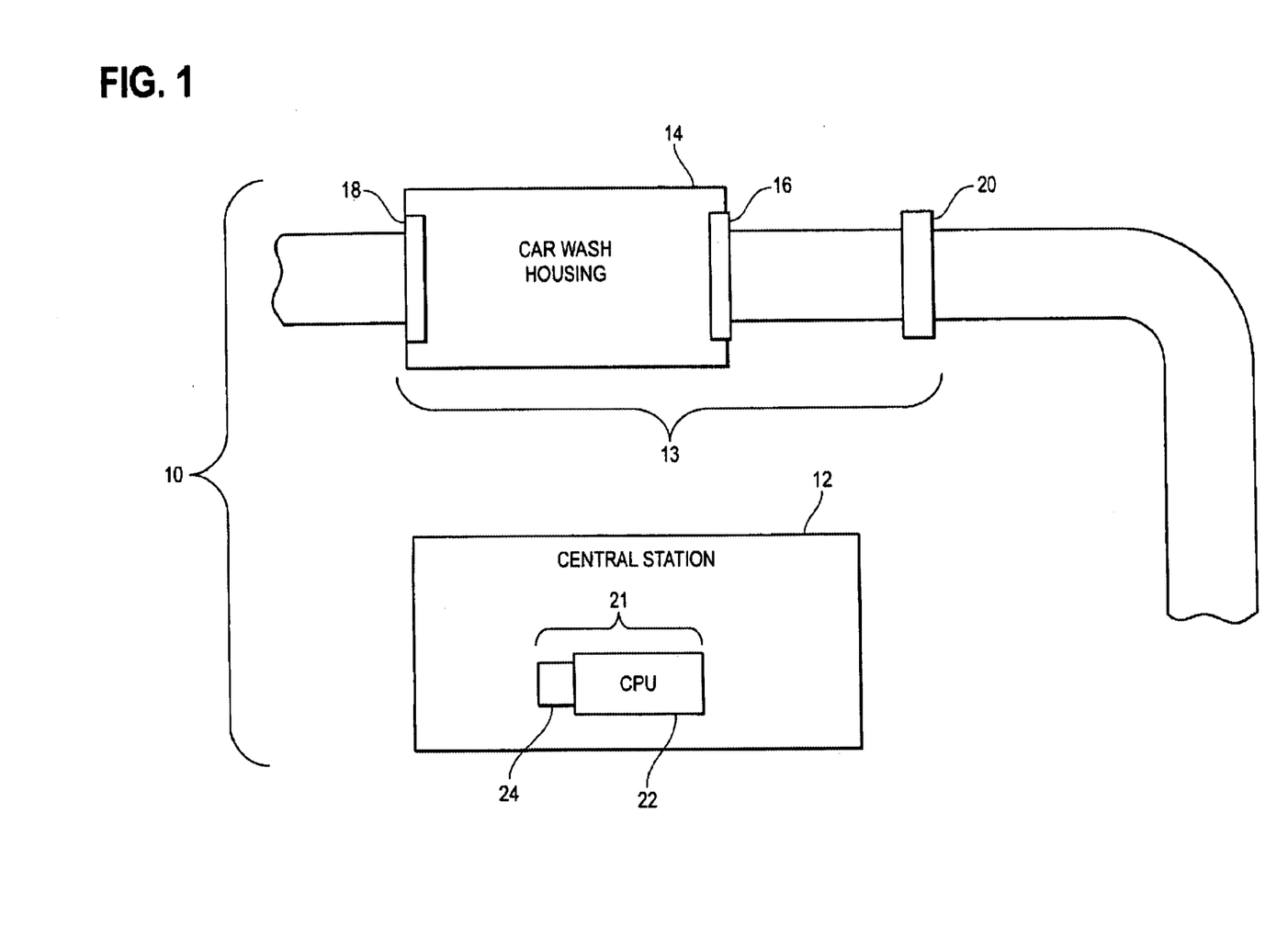
FIG. 1 is a schematic diagram of a variable speed automatic car wash system according to an embodiment of the present invention.

FIG. 1 is a schematic diagram of the variable speed automatic car wash system 10, according to an embodiment of the present invention. The variable speed automatic car wash system 10 includes a central station 12, a car wash 13 including a car wash housing 14 having a vehicle entrance 16 and a vehicle exit 18, and a customer sensor 20. The central station 12 includes a car wash control system 21 having a central processing unit (CPU) 22 that is electronically connected, either wirelessly or through electrical wires or cables, to the car wash housing 14 and an operator interface unit 24 having an input device and a visual display, such as a monitor or digital display. The CPU 22 may be included within a computer terminal within the central station 12. By way of example only, the CPU 22 may be a general purpose processor, microcontroller, or embedded controller, and operates under general program control of instructions stored in an associated memory. It is to be understood that the use of the term "car" refers to various types of vehicles, including, but not limited to, cars, trucks, vans, buses, and the like.

The variable speed car wash system 10 may be an unattended system, in which an operator pays little to no attention to the operation of the car wash housing 14 once wash mode parameters have been initially programmed within the system 10. Wash mode parameters for different wash modes having different temporal lengths and/or features are input into the CPU 22. The CPU 22 stores instructions for the plurality of wash modes (e.g., a high-speed wash mode, a normal wash mode and a low-speed wash mode) based on the parameters for each wash mode that were input. The car wash 13 is operated at various wash modes depending on customer frequency, customer (vehicle) number, environmental conditions and/or other reasons (such as operator preference). For example, the car wash 13 may be operated at a high-speed wash mode by the CPU 22 when a large number of customers are waiting in line. The CPU 22 may be programmed to recognize different customer frequencies and automatically switch wash modes accordingly. Also, the CPU 22 or an operator may determine that certain environmental conditions exist (e.g., snow and salt on the roads) and switch to an appropriate environmentally based wash mode.

The variable speed car wash system 10 may be part of a conventional gas station. The central station 12 may be, for example, a gas station pay booth or shop. The car wash control system 21 controls the operation of the car wash 13. The customer sensor 20 is also electronically connected to the car wash control system 21, either wirelessly or through electrical wires or cables. Alternatively, more than one customer sensor 20 may be used.

The customer sensor 20 may be, for example, a loop detector (such as used in conjunction with traffic lights to determine the number of vehicles waiting at an intersection), a photoelectric sensor, ultrasonic sensors, optical sensors (such as infrared emitters and detectors) or the like. The customer sensor 20 may be any type of device that senses the physical presence of an automobile. For example, the customer sensor 20 may detect a vehicle by sensing the weight of the vehicle at a particular position. Also, for example, the customer sensor 20 may be an optical sensor including a light emitter and a light detector. The optical sensor may detect the presence of a vehicle by sensing when a beam of light emitted from the emitter is not received by the detector. The customer sensor 20 may be positioned a certain number of car lengths, for example three car lengths, in front of the car wash housing 14. Alternatively, the customer sensor 20 may be formed in conjunction with a car wash activation device (not shown), which relays signals to the car wash control system 21. For example, the CPU 22 may be able to detect customer rate through the frequency of car wash activation.

In operation, an operator enters various set-up parameters (discussed below with respect to FIG. 5) into the CPU 22 by way of the operator interface unit 24. The operator interface unit 24 includes an input device such as a computer keyboard, mouse, touchscreen, or other such device, which allows the operator to input data into the CPU 22. The set-up parameters may include wash mode transition points (such as when a certain customer rate is detected by the customer sensor 20), wash-speed cycles and times for a plurality of wash modes, such as fast, normal and slow modes. Once the operator inputs the set-up parameters for various wash modes, the wash modes are stored in the CPU 22 as wash mode programs (or wash mode instruction programs). After the programs have been set, the car wash housing 14 may be used by a customer.

A customer may purchase a car wash at the central station 12, or at a remote station, such as a fuel pump station. For example, a desk attendant (e.g., a cashier) in the central station may issue a car wash code, determined by the CPU 22, to the customer either within the central station 12 or at a remote station, such as a fuel pump station. Alternatively, the customer may be issued a car wash code at a transaction device or kiosk located near the car wash 13. The car wash code may, for example, be printed on a customer receipt for fuel or car wash purchase. After the customer receives the code, the customer drives his/her vehicle to the car wash activation device. The customer enters the code at the car wash activation device. Once the code is entered, the customer is directed to enter the car wash housing 14, e.g., by a display or by opening a garage door or similar barrier at the car wash entrance 16 to allow the vehicle to enter.

Optionally, instead of receiving an activation code at the central station 12, a customer may be able to purchase a wash at the car wash activation device. That is, the car wash activation device may include a transaction interface such that a customer may use cash, credit card and the like to purchase a wash.

When a vehicle is being washed inside the car wash housing 14, other vehicles may wait in line to be washed. The customer sensor 20 detects the presence of these vehicles and relays a data signal regarding the presence of vehicles to the CPU 22. The customer sensor 20 may, for example, relay to the CPU 22 the presence of a vehicle and the amount of time a vehicle is in the same position. The CPU 22 is programmed to switch between a plurality of wash modes depending on the information the CPU 22 receives from the customer sensor 20. If the CPU 22 determines that a vehicle is positioned within the sensing area of the customer sensor 20 for less than a predetermined length of time, the CPU 22 continues to operate the car wash 13 at a particular wash mode. If, however, the CPU 22 determines that a vehicle is positioned within the sensing area of the customer sensor 20 for more than a predetermined length of time, the CPU 22 may operate the car wash 13 at a faster wash mode. Additionally, the CPU 22 may be programmed such that if the CPU 22 determines that a vehicle is positioned within the sensing area of the customer sensor 20 for too long of a time (a pre-programmed "stalled vehicle" setting), the CPU 22 may operate the car wash 13 at the normal wash mode.

Alternatively, the variable speed car wash system 10 may not include a customer sensor 20, per se, but instead determine the frequency of vehicles through the frequency of customers inputting codes into the car wash activation device. For example, if the CPU 22 determines that activation codes are input into the activation device at a predetermined rate (based on programmed parameters), the CPU 22 may switch to a faster or slower wash mode depending on the rate of activation.

Alternatively, the car wash system 10 may utilize a sensor that detects the number of vehicles in line, or the frequency of vehicles. For example, a position sensor may be positioned a predetermined distance, e.g., forty-five feet, in front of the car wash housing 14. The CPU 22 may be programmed to recognize that when a vehicle is sensed at this distance for an extended period of time, that a particular amount of cars are in line. The CPU 22 may be programmed to switch between wash modes based on the number of vehicles in line, as opposed to the frequency of customer use. Also, alternatively, a plurality of position sensors may be used to determine the number of vehicles waiting in line for the car wash 13.

Optionally, the car wash system 10 may include a programmable logic controller (PLC), which may be physically located in the car wash housing 14, equipment room, car wash gantry, or various other locations within the car wash system. The PLC includes a CPU. The PLC may store numerous wash mode parameters and may control the operation of the car wash 13. Further, the PLC and an operator interface unit in the central station 12 may control the operation of the car wash 13.

Additionally, a car wash housing 14 is not required. That is, a car wash area may be used with the car wash system 10 that includes wash equipment open to the environment.

Also, alternatively, the car wash control system 21 may be networked or electronically connected to other computers and electronic devices. Thus, for example, an operator may program wash mode parameters for the car wash system 10 from a remote computer or electronic device.

Figure 2:
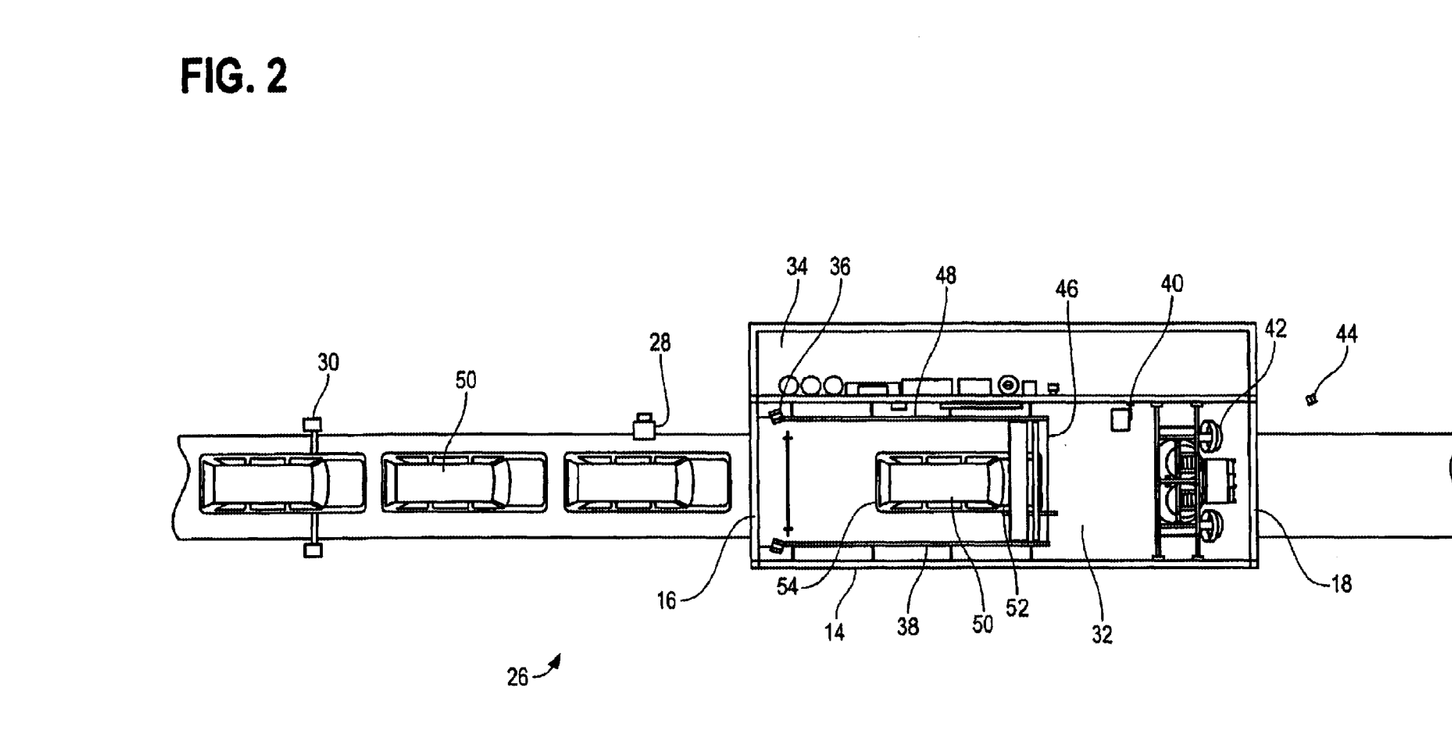
FIG. 2 illustrates a top view of a car wash according to certain aspects of an embodiment of the present invention.

FIG. 2 illustrates a top view of a car wash 26 according to certain aspects of an embodiment of the present invention. The car wash 26 may include an activation device 28 (such as a 10 digit keypad), a vehicle proximity sensor 30 and the car wash housing 14 having the vehicle entrance 16 and the vehicle exit 18. The car wash housing 14 includes a vehicle chamber 32, in which vehicles may pass, and a mechanical operations chamber 34, which houses various mechanical components of the car wash 26 such as wash assembly pumps, cleaning agent metering assemblies, etc. The car wash 26 also includes a side blaster 36, a washing assembly 38, a display 40, a dryer assembly 42 and a dryer display 44. The washing assembly 38 includes a washing gantry 46 positioned on support tracks 48. The support tracks 48 are positioned to allow for sufficient clearance between the washing gantry 46 and a vehicle 50. The washing gantry 46 may slide, roll, or otherwise move on, over or through the support tracks 48. Specifically, the washing gantry 46 may move between a first (or front) end 52 of the vehicle 50 to a second (or back) end 54 of the vehicle 50. The washing gantry 46 includes washing and waxing devices that direct high pressure water, cleaning agents/chemicals and the like onto the vehicle 50.

In operation, a customer drives his/her vehicle 50 to the activation device 28. The customer enters an activation code into the activation device 28 (or otherwise purchases a wash using cash, credit card, tokens and the like). If the activation code is valid, a garage door opens at the vehicle entrance 16 or the customer is prompted to drive his/her vehicle 50 into the car wash housing 14. The issuance of activation codes, the mechanical operation of the car wash 26 and the various visual display messages, etc., within the car wash housing 14 are set and controlled by the CPU 22 of the car wash control system 21 in the manner described above. As mentioned above, various modes of car wash operation may be programmed for the car wash 26. Different wash modes may be used depending on the rate of customer use, the number of customers waiting in line, environmental conditions and/or other reasons, such as operator preferences.

The customer drives his/her vehicle 50 into the vehicle chamber 32 at the prompting of the instructions displayed on the activation device 28 and/or the display 40. The display 40 may display digital messages directing the customer to "drive slowly," "stop," "exit," etc., depending on the position of the vehicle 50 within the vehicle chamber 32. In this manner, the display 40 assists the customer in proper placement of his/her vehicle during the stages of a wash mode.

As the vehicle 50 is driven into the vehicle chamber 32, the side blasters 36 may spray the sides and/or undercarriage of the vehicle 50 with high-pressure water and/or cleansing agents/chemicals. The display 40 may act as a timer during this step, signaling the driver with the time remaining during this portion of the wash cycle. Once the vehicle 50 is properly positioned for washing, the display 40 instructs the customer to stop the vehicle 50. Once the vehicle 50 is stopped, the washing gantry 46 sprays water and/or cleansing agents/chemicals onto the vehicle 50 according to a pre-programmed sequence. As mentioned above, the washing gantry 46 may move over the support tracks 48 thereby traveling between the first end 52 and the second end 54 of the vehicle 50. After the wash cycle is completed, the display 40 instructs the customer to drive the vehicle 50 out of the car wash housing 14. As the vehicle exits the car wash housing 14, the vehicle passes by the dryer assembly 42. As this occurs, the dryer assembly 42 may operate (depending on the wash mode) to dry the vehicle. As the customer exits the car wash housing 14, the dryer display 44 displays the amount of time the drying assembly 42 will remain activated. After the drying cycle is complete, the customer may drive his/her vehicle 50 out of the car wash housing 14. Optionally, the customer may drive out during the dry cycle.

As mentioned above, as vehicles 50 begin to congregate in line, a customer sensor 20 may be provided for detecting the presence of vehicles 50. The CPU 22 is programmed to switch among various wash modes in response to the CPU 22 recognizing a predetermined number of vehicles in line, customer frequency and/or environmental conditions. According to one embodiment of the present invention, the activation device may serve as the customer sensor 20. In this embodiment, the CPU 22 is programmed to switch among wash modes based on the rate/frequency of customers inputting activation codes into the activation device 28. If, for example, the CPU 22 determines that customers are inputting activation codes into the activation device 28 at a high frequency, the CPU 22 operates the car wash at a fast, or high-speed wash mode, in order to keep the line of waiting vehicles 50 moving at a tolerable, or customer-friendly pace. On the other hand, if the CPU 22 determines that customers are inputting activation codes into the activation device 28 at a low frequency, the CPU 22 operates the car wash at a slower than normal, or slow-speed wash mode.

Alternatively, as shown in FIG. 2, one or more vehicle proximity sensors 30 may be used to detect customer frequency or the number of vehicles waiting in line. As mentioned above, a variety of vehicle proximity sensors 30 may be used. For example, the vehicle proximity sensor 30 may be a loop detector, ultrasonic sensor, photoelectric sensor or optical sensor. The vehicle proximity sensor 30 relays to the CPU 22 the presence of a vehicle 50 positioned within a sensing area of the proximity sensor 30. In this embodiment, the CPU 22 is programmed to switch among wash modes based on the rate/frequency of customers detected by the vehicle proximity sensor 30. If, for example, the CPU 22 determines that the vehicle proximity sensor 30 detects the presence of vehicles 50 at a high rate, the CPU 22 operates the car wash at a fast, or high-speed wash mode, in order to keep the line of waiting vehicles 50 moving at a tolerable, or customer-friendly pace. On the other hand, if the CPU 22 determines that the vehicle proximity sensor 30 detects vehicles 50 at a low rate, the CPU 22 operates the car wash at a slower than normal, or slow-speed wash mode.

The CPU 22 may be programmed to switch back to an original wash mode if the vehicle proximity sensor 30 detects the presence of a vehicle for longer than a predetermined length of time. The CPU 22 may be programmed to switch back to an original wash mode if the vehicle proximity sensor 30 detects the presence of a vehicle for more than ten minutes, or another length of time that exceeds the length of time for a wash cycle. For example, a vehicle 50, or other massive object (perhaps a dumpster), may be stalled or otherwise marooned within the sensing area of the proximity sensor 30, instead of being positioned behind other vehicles 50 waiting in line. In this case, the car wash 26 may operate at the normal wash mode because there may not, in fact, be a line of vehicles 50 waiting to be washed. Alternatively, if the driveway entrance to the car wash is not wide enough to let vehicles pass the stalled, stranded or otherwise marooned object, the CPU 22 may display or otherwise alert the attendant in the central station 12 (through, for example, a computer monitor) that the entrance is blocked.

Alternatively, the CPU 22 may switch wash modes based on the number of vehicles 50 waiting in line to be washed. For example, the vehicle proximity sensor(s) 30 may be positioned a certain distance in front of the car wash housing 14, such as three or four car lengths in front of the car wash housing 14. When the CPU 22 determines that the proximity sensor(s) 30 detects the presence of a vehicle 50 for an extended period of time (such as the temporal length of one car wash cycle), the CPU 22 determines that a certain number of vehicles 50 are waiting in line. The CPU 22 may then switch to a different wash mode based on the number of vehicles 50 waiting in line.

As still another alternative, an operator located within the central station 12 can manually switch among wash modes. The operator may switch among various wash modes based on his/her perceptions of customer rate, number, environmental conditions, or simply his/her preference. An operator may decide to switch to an extra thorough wash mode, which has been programmed into the CPU 22, in an effort to increase customer satisfaction and loyalty. For example, as mentioned above, the operator initially programs a plurality of wash modes into the CPU 22. Depending on weather conditions and/or the operator's perceptions of customer frequency, the operator can switch among various wash modes through the operator interface unit 24. The operator can also override a wash mode determined by the CPU 22 by manually selecting a wash mode through the operator interface unit 24.

As discussed above, the operator programs various wash modes into the CPU 22. However, the CPU 22 may be pre-programmed by the manufacturer. That is, the CPU 22 may include default wash modes. Optionally, operators may instruct the manufacturer regarding standard parameters for various wash modes. The manufacturer may then set up default wash modes based on these instructions.

Figure 3:
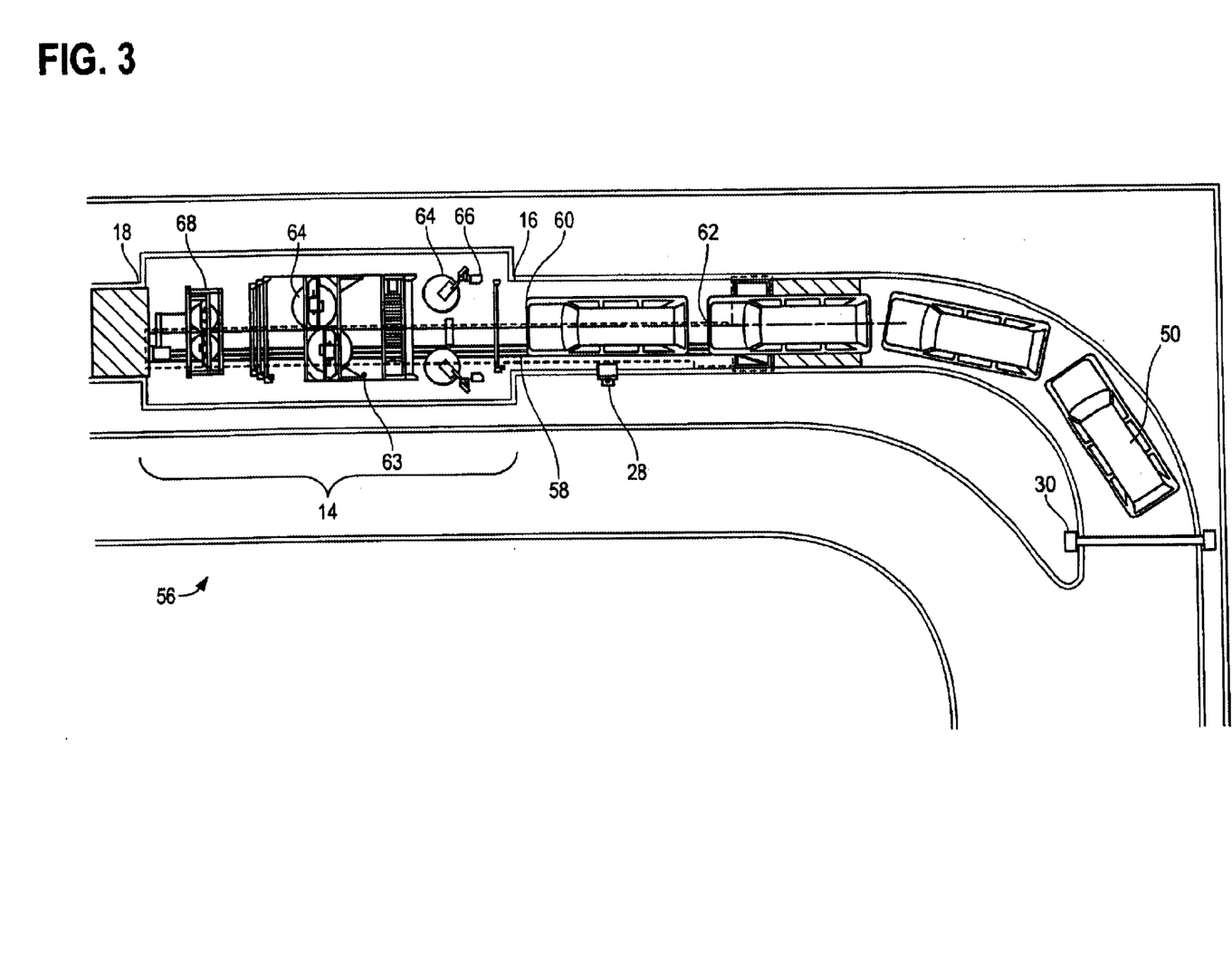
FIG. 3 illustrates a top view of a car wash according to an embodiment of the present invention.

FIG. 3 illustrates a top view of a car wash 56 according to another embodiment of the present invention. The car wash 56 is controlled by the CPU 22 similar to that described above with respect to FIG. 2. For example, the CPU 22 switches among different wash modes according to customer frequency or vehicle number similar to that described above. The car wash 56 includes a conveyor system 58 for moving vehicles through the car wash 56. The conveyor system 58 includes a guide track 60 having a wheel inlet 62 for receiving a wheel of a vehicle 50. The car wash 56 also includes a washing carriage 63, scrubbing mechanisms 64, high-pressure sprayers 66 and a drying assembly 68. The vehicle 50 is guided through the car wash 56 by way of the conveyor system 58. Specifically, a customer drives his/her vehicle into the car wash 56 so that the front driver's side wheel enters the wheel inlet 62. An engaging member (not shown) within the conveyor system 58 engages the wheel such that the vehicle 50 may be moved by the conveyor system 58. The customer may then be directed to shift his/her vehicle into neutral, so that the conveyor system 58 may easily move the vehicle 50 vehicle through the car wash 56. The vehicle 50 is then moved through the car wash 56 by the conveyor system 58 during a wash mode. Various wash modes, including various conveyor speeds, may be automatically determined by the CPU 22 depending on the number of customers and/or environmental conditions, or manually through the operator changing modes by way of the operator interface unit 24.

Figure 4:
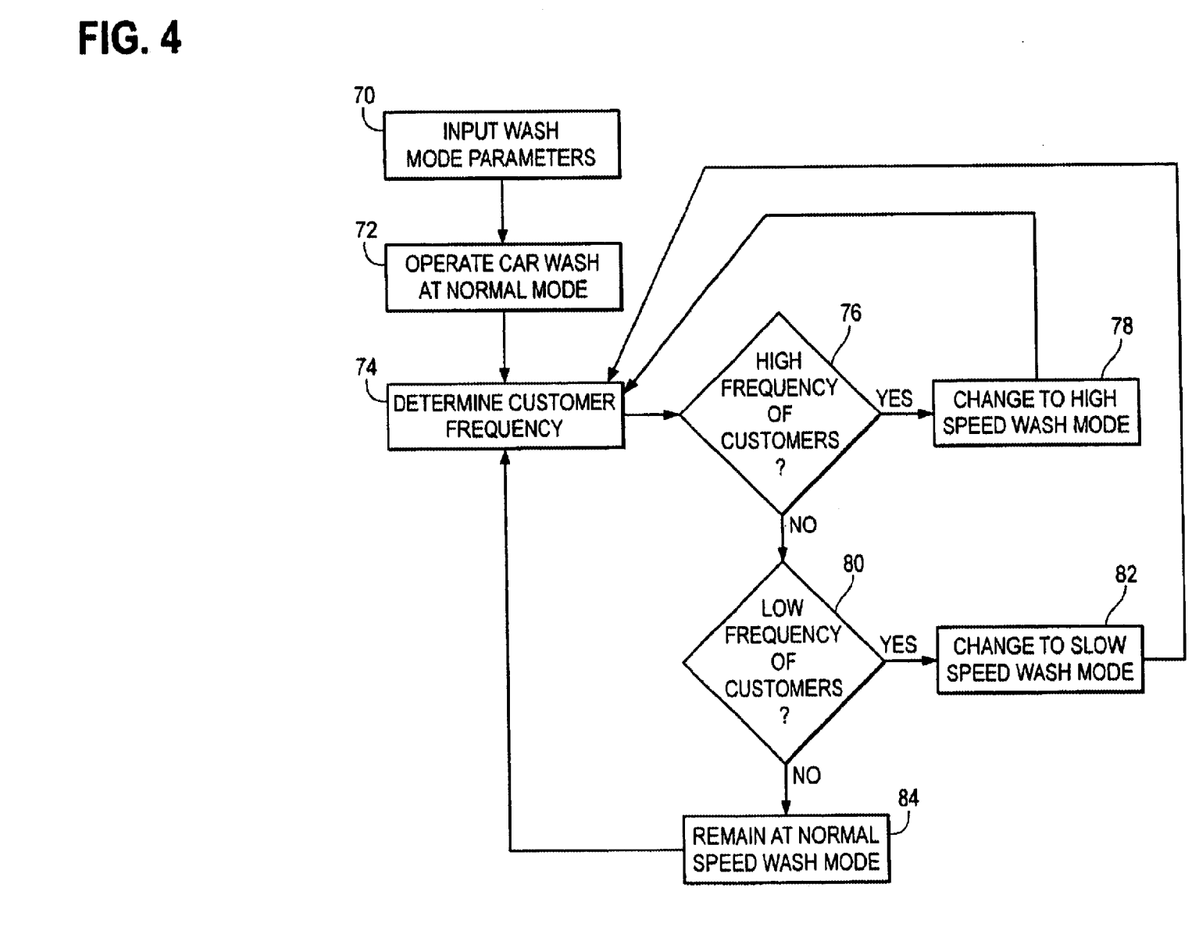
FIG. 4 is an operational flow chart of the variable speed car wash system according to an embodiment of the present invention.

FIG. 4 is an operational flow chart of the variable speed car wash system 10 according to an embodiment of the present invention. At 70, an operator, such as a gas station owner or attendant, inputs or sets wash mode parameters into the CPU 22 through the operator interface unit 24. For example, as discussed below, the operator can input parameters (such as wash cycle duration and drying time) for a plurality of wash modes, such as a normal wash mode, a high-speed wash mode, a low speed wash mode, and/or various other modes of operation. A set of parameters for a particular wash mode is stored within the CPU 22 as wash mode instructions. For example, an operator may input a plurality of parameters (including wash cycle duration, drying time, etc.) for a high-speed wash mode and then store the parameters in the CPU 22 as a high-speed instructions program. The CPU 22 operates the car wash 13 according to the various wash modes, such as the high-speed instructions program, based on the instructions stored within the CPU 22.

At 72, the CPU 22 initially operates the car wash 13 at a normal (default) mode. As customers activate the car wash 13, the CPU determines customer frequency (i.e., the rate at which customers use the car wash 13) or the number of vehicles in line at 74. By analyzing data received from the customer sensor 20, the CPU 22 determines customer frequency or the number of vehicles waiting in line. The CPU 22 may be programmed to recognize certain customer usage rates or frequencies as high rates, low rates, a normal rate, or various rates in between.

For example, the proximity sensor 30 may be positioned a distance from the car wash housing 14 such that when the CPU 22 detects, by way of the proximity sensor 30, vehicle presence for a predetermined allotted time (e.g., more than two minutes, but less than ten minutes), the CPU 22 may determine that there is a high customer frequency. If, for example, the CPU 22 detects no vehicle presence for a predetermined time, then the CPU 22 may determine that there is a low customer frequency. If, for example, the CPU detects extended vehicle presence (e.g., more than ten minutes or any other time variable programmed into the CPU 22 by the operator), the CPU 22 may determine that the car wash 13 should be operated at a normal wash mode.

Alternatively, the activation device 28 can be used as the frequency or rate detector. For example, if the CPU 22 detects that activation codes are being input into the activation device 28 at a rate of, for example, one per 2 minutes, the CPU 22 may determine that there is a high customer frequency. If the CPU 22 detects that activation codes are being input into the activation device at a rate of, for example, one per ten minutes, the CPU 22 may determine that there is a low customer frequency.

If, at 76, there is a high frequency of customers or a high number of vehicles waiting to be washed, the CPU 22 switches from normal wash mode to a high-speed wash mode at 78. The high-speed wash mode is a shorter wash mode than the normal wash mode. Thus, more vehicles may be washed in a shorter period of time as compared to the normal wash mode. Alternatively, the operator, such as the attendant, may manually transition the car wash 13 to the high-speed wash mode by inputting a command into the CPU 22 by way of the operator interface unit 24. The operator may, for example, decide that a shorter wash cycle, such as that used within the high-speed wash mode, is sufficient to adequately wash vehicles on a particular day.

If a high frequency condition is not detected at 76, control is passed to 80 to determine if a low frequency condition exists. If there is a low frequency of customers, the CPU 22 can be programmed to transition the car wash 13 to a slow speed wash mode at 82. The slow speed wash mode is longer than the normal wash mode. Alternatively, the operator, such as the attendant, may manually transition the car wash 13 to the slow-speed wash mode by inputting a command into the CPU 22 by way of the operator interface unit 24. The operator may decide that the slow-speed wash mode is needed to adequately wash a car depending on weather conditions (for example, during the winter if vehicles are covered with snow and/or salt). Because the slow speed wash mode is slower than the normal wash mode, a vehicle may be subjected to a longer and more thorough wash cycle. If, however, the CPU 22 determines that there is not a low frequency of customers (and not a high frequency of customers), the CPU 22 continues to operate the car wash 13 at the normal wash mode at 84. Alternatively, if the operator selected a wash mode based on his preferences, the operator may lock the wash mode, such that the CPU 22 cannot override his/her decision.

As mentioned above, various wash modes may be programmed into the CPU 22. For example, normal, high-speed, low-speed, seasonal and intermediate wash modes may be programmed into the CPU 22. An operator may switch among seasonal or environmental wash modes based on his/her perceptions of environmental conditions (such as snow, rain, dust, etc.). Alternatively, the variable speed car wash system 10 may also include precipitation, temperature or other environmental sensors (e.g., a thermometer), that are electronically connected and sensed by the CPU 22. Optionally, the CPU 22 may be networked or otherwise electronically connected to an up-to-date weather center, such as a website or a server of a local news channel office. The CPU 22 may then determine various environmentally-based wash modes based on the environmental conditions detected by the CPU 22 or the remote weather center.

Figure 5:
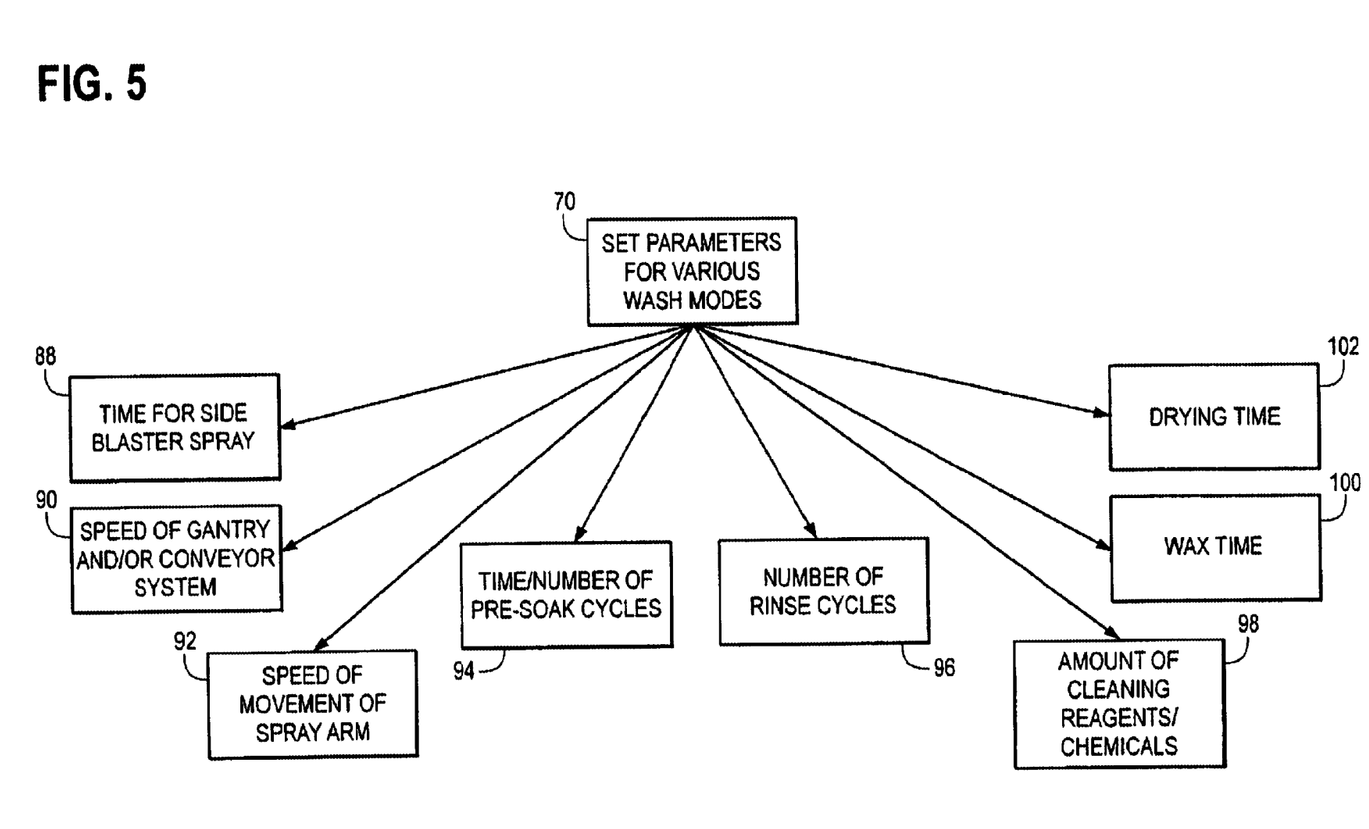
FIG. 5 is a chart illustrating various examples of wash parameters of the variable speed automatic car wash system, according to an embodiment of the present invention.

FIG. 5 is a chart illustrating various examples of wash parameters of the variable speed automatic car wash system, according to an embodiment of the present invention. As mentioned above, at 70, the operator inputs or sets parameters of the variable speed car wash system 10 for various wash modes. The parameters of each wash mode are stored in the CPU 22 as separate sets of wash mode instructions. For example, at 88, the time for the side blaster 36 spray may be set. In a normal wash mode, the side blaster spray may be set for a first allotted time, such as ten or twenty seconds. The operator may set the side blaster spray for less time for a high speed wash mode, and more time for a low speed wash mode.

Similarly, at block 90 the operator may set the speed of the washing gantry 46 and/or the conveyor system 58. Speeds for a normal wash mode may be set, with higher speeds being set for a high-speed wash mode and lower speeds being set for a low-speed wash mode. Similarly, at 92, the speed of the movement of a spray arm, located on a wash assembly, may be set at different speeds.

The variable speed car wash system 10 may also include pre-soak cycles in which cleaning agents/chemicals are applied to a vehicle. The time and/or number of pre-soak cycles (the time in which cleaning agents/chemicals are applied and remain on a vehicle before being washed off) may be set for various wash modes at 94. Further, the number and time of rinse cycles may be set for various wash modes at 96. Also, the amount of cleaning agents/chemicals applied to a vehicle may be set for various wash modes at 98. Similarly, the amount and time of wax application may be set for various wash modes at 100. Additionally, drying time may be set for various wash modes at 102. Any, all, or a portion of the parameters may be varied. That is, an operator may choose to set a high-speed wash by increasing the speed of the washing gantry and/or conveyor system alone, or in combination with other parameters. Additionally, other parameters not discussed above may be used and varied within the variable speed car wash system 10.

Thus, embodiments of the present invention provide a more efficient method of washing a vehicle in an automatic car washing system in that a variety of wash mode instructions may be programmed into the CPU. The CPU may then operate the car wash according to the instructions based on customer frequency and/or environmental conditions.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

What is claimed is:

1. A method of operating an automatic car wash system, the automatic car wash system including a car wash unit and a control system that controls operation of the car wash unit, said method comprising:

storing wash mode parameters for a plurality of wash modes in the control system, said wash modes being based on levels of customer demand;

executing the wash modes based on the wash mode parameters;

automatically determining when to switch among wash modes based on the levels of customer demand; and switching among the plurality of wash modes based on said determining step.

2. The method of claim 1 further comprising programming wash mode parameters for a plurality of wash modes into the control system.

3. The method of claim 1 wherein said determining when to switch among wash modes step comprises determining a rate at which customers use the car wash unit.

4. The method of claim 1 wherein sand determining step when to switch among wash modes step comprises determining a number of vehicles waiting in line to be washed.

5. The method of claim 1 wherein said wash modes are also based on environmental conditions and wherein said determining step includes determining when to switch among wash modes step comprises determining environmental conditions.

6. The method of claim 1 wherein said switching step comprises automatically switching among the plurality of wash modes.

7. The method of claim 1 wherein said switching step comprises manually switching among the plurality of wash modes by manually inputting data into an operator interface unit, which is electronically connected to the control system.

8. The method of claim 1 wherein said plurality of wash modes comprise a normal wash mode, a high-speed wash mode, a low-speed wash mode, at least one environmental wash mode, and at least one operator preference wash mode.

9. The method of claim 1 wherein said determining step comprises determining a low rate of customer use when a vehicle is not detected by a customer sensor.

10. The method of claim 1 wherein said determining step comprises determining a high rate of customer use when a vehicle is detected by a customer sensor.

11. The method of claim 1 wherein said determining step comprises detecting customer use of the car wash unit through a vehicle proximity sensor.

12. The method of claim 1 wherein said determining step comprises detecting customer use of the car wash unit through activation of the car wash unit.

13. The method of claim 1 wherein said wash mode parameters comprise at least one of washing assembly speed; time of wash cycle; number of wash cycles; time of rinse cycle; number of rinse cycles; amount of cleaning chemicals, duration of wax application, and time of drying.

14. A variable speed automatic vehicle washing system comprising:

an automated car wash;

a control system for operating said automated car wash, said control system storing first wash mode operating instructions to be used at a first customer frequency and second wash mode operating instructions to be used at a second customer frequency, said control system operating said automated car wash for a first length of time according to said first wash mode operating instructions when said control system determines said first customer frequency, and said control system operating said automated car wash for a second length of time according to said second wash mode operating instructions when said control system determines said second customer frequency.

15. The system of claim 14 further comprising a vehicle proximity sensor in communication with said control system, and said control system determining said first and second customer frequencies through said vehicle proximity sensor.

16. The system of claim 14 further comprising a car wash activation device in communication with said control system, and said control system determining said first and second customer frequencies through a rate of activation of said car wash input into said car wash activation device.

17. The system of club 14 wherein said control system stores normal wash mode operating instructions, said control system operating said automated car wash according to said default wash mode operating instructions when said control system does not determine said first and second customer frequencies.

18. The system of claim 14 further comprising a central station remotely located from said automated car wash, said central station having a car wash control system having said control system and an operator interface unit for inputting data into said control system.

19. The system of claim 14 further comprising an operator interface unit electronically connected to said control system, said operator interface unit being used to input data of said first and second wash mode instructions into said control system, and said operator interface unit being operable to override an operation of said automated car wash.

20. The system of claim 14 wherein said control system stores environmental wash mode operating instructions to be used during an environmental condition, said control system operating said automated car wash according to said environmental wash mode operating instructions when an operator or said control system detects said environmental condition.

21. The system of claim 14 wherein said fist and second wash mode instructions differ in at least one of the following: speed of washing assembly; speed of conveyor system; time of wash cycle; number of wash cycles; time of rinse cycle; number of rinse cycles; amount of cleaning chemicals; duration of wax application and time of drying.

22. A method of operating an automatic car wash system, the automatic car wash system including a car wash unit and a control system that controls operation of the car wash unit, said method comprising:
    storing a first set of instructions for a first wash mode having a first temporal length in the CPU;
    storing a second set of instructions for a second wash mode having a second temporal length in the CPU;
    determining customer use of the car wash unit;
    automatically operating the car wash unit according to the first set of instructions when the customer use exceeds a preselected value; and
    automatically operating the car wash unit according to the second set of instructions when the customer use is less than or equal to the pre-selected value.

23. The method of claim 22 wherein said determining step includes detecting customer use through a vehicle proximity sensor.

24. The method of claim 22 further comprising manually switching between first and second wash modes by inputting data into the control system by way of an operator interface unit.

25. The method of claim 22 wherein said determining step comprises detecting the customer use through an activation rate of the car wash.

26. The method of claim 22 further comprising programming wash mode parameters comprising at least one of washing assembly speed; time of wash cycle; number of wash cycles; time of rinse cycle; number of rinse cycles; amount of cleaning chemicals; duration of wax application; and time of drying for each of the first and second wash modes into the control system before said storing step.

27. A variable speed automatic vehicle washing system comprising:
    an automated car wash;
    a car wash control system comprising:
        a central processing unit (CPU);
        an operator interface unit electronically connected to said CPU, said operator interface unit being used for inputting first and second sets of wash mode parameters into said CPU, said CPU storing said first and second sets of wash mode parameters; and
        a customer sensor electronically connected to said CPU, said CPU, determining a first and second customer rate through data received from said customer sensor, said CPU operating said automated car wash for a first length of time according to said first wash mode parameters when said CPU determines said fist customer rate, and said CPU operating said automated car wash for a second length of time according to said second wash mode parameters when said CPU determines said second customer rate.

28. The system of claim 27 wherein said customer sensor is at least one of a loop detector; an optical sensor; a photoelectric sensor, or a car wash activation device.

29. The system of claim 27 wherein said CPU stores default wash mode operating parameters, said CPU operating said automated car wash according to said default wash mode operating parameters when said CPU does not determine said first and second customer rates.

30. The system of claim 27 wherein said car wash control system is remotely located from said automated car wash.

31. The system of claim 27 wherein said CPU stores environmental wash mode operating parameters to be used during an environmental condition, said CPU operating said automated car wash according to said environmental wash mode operating instructions when an operator or said CPU detects said first environmental condition.

32. The system of claim 27 wherein said first and second wash mode instructions differ in at least one of the following: speed of washing assembly; speed of conveyor system; time of wash cycle; number of wash cycles; time of rinse cycle; number of rinse cycles; amount of cleaning chemicals; duration of wax application and time of drying.

33. A method of operating an automatic car wash system, the automatic car wash system including a car wash and a control system that controls operation of the car wash unit, said method comprising:
    automatically switching among a plurality of pre-programmed wash modes based on rates of customer use of the car wash, environmental conditions and operator preference.

34. The method of claim 33 further comprising programming wash mode parameters for a plurality of wash modes into the control system.

35. The method of claim 33 wherein the plurality of pre-programmed wash modes comprise a normal wash mode, a high-speed wash mode and a low-speed wash mode.

36. The method of claim 33 wherein the plurality of pre-programmed wash modes comprise at least one environmental wash mode.

37. The method of claim 33 wherein the plurality of pre-programmed wash modes comprise at least one operator preference wash mode.

38. The method of claim 33 wherein said switching step comprises automatically switching among the plurality of pre-programmed wash modes in response to the rate of customer use detected by a customer sensor.

39. The method of claim 33 wherein said switching step includes switching among the plurality of pre-programmed wash modes in response to a number of vehicles waiting in line detected by at least one vehicle proximity sensor.

40. A method of operating an automatic car wash system, the automatic car wash system including a car wash and a control system that controls operation of the car wash unit, said method comprising:

programming wash mode parameters for a plurality of environmentally-based wash modes, which are automatically activated based on environmental conditions, into the control system; and programming wash mode parameters for a plurality of customer use wash modes, which are automatically activated based on rates of customer use of the car wash unit, into the control system.

41. The method of claim 40 wherein said plurality of wash environmentally-based and customer use wash modes comprise a normal wash node, a high-speed wash mode, and a low-speed wash mode.

42. The method of claim 40 wherein the wash mode parameters comprise at least one of washing assembly speed; time of wash cycle; s number of wash cycles; time of rinse cycle; number of rinse cycles; amount of cleaning chemicals; duration of wax application; or time of drying.

43. The method of claim 40 wherein said plurality of wash modes comprise at least one of a fair weather wash mode, a wet road wash mode, a salty road wash mode and an excessive dirt wash mode.

44. A method of operating an automatic car wash system, the automatic car wash system including a car wash unit and a control system that controls operation of the car wash unit, said method comprising:

programming wash mode parameters for a plurality of wash modes into the control system;

storing wash mode parameters for a given wash mode;

executing a wash mode based on the wash mode parameters;

automatically determining rate at which customers use the car wash unit, a number of vehicles waiting in line to be washed, and environmental conditions; and switching among the plurality of wash modes based on at least one of the rate determined in said determining step, the number determined in said determining step, or the environmental conditions determined in said determining step.

45. The method of claim 44 wherein said plurality of wash modes comprise a normal wash mode, a high-speed wash mode, a low-speed wash mode and at least one environmentally-based wash mode.

46. The method of claim 44 wherein said switching step comprises manually switching among the plurality of wash modes through an operator interface unit.

47. The method of claim 44 wherein said switching step comprises automatically switching among the plurality of wash modes in response to the rate determined in said determining step.

48. The method of claim 44 wherein said determining step comprises determining a low rate of customer use when a vehicle is not detected by a vehicle sensor.

49. The method of claim 44 wherein said determining step comprises determining a high rate of customer use when a vehicle is detected by a vehicle sensor.

50. The method of claim 44 wherein said determining step comprises detecting customer use of the car wash unit through activation of the car wash unit.

51. The method of claim 44 wherein said programming step comprises programming wash mode parameters comprising at least one of washing assembly speed, time of wash cycle; number of wash cycles; time of rinse cycle; number of rinse cycles; amount of cleaning chemicals, duration of wax application, or time of drying.

52. The method of claim 44 wherein said environmental conditions include temperature, snow, dust, sunshine, and salty roads.

53. A method of operating an automatic car wash system, the automatic car wash system including a car wash unit and a control system that controls operation of the car wash unit, said method comprising automatically determining when to switch among wash modes based on levels of customer demand.

* * * * *